United States Patent [19]
Plamthottam et al.

[11] Patent Number: 5,851,683
[45] Date of Patent: Dec. 22, 1998

[54] SEQUENTIAL COPOLYMER BASED GLOVES

[75] Inventors: Sebastian S. Plamthottam, Upland; Bessie E. Callos, Palmdale, both of Calif.

[73] Assignee: Allegiance Corporation, McGaw Park, Ill.

[21] Appl. No.: 820,452

[22] Filed: Mar. 17, 1997

Related U.S. Application Data

[60] Continuation of Ser. No. 457,871, Jun. 1, 1995, abandoned, which is a division of Ser. No. 370,212, Jan. 6, 1995, abandoned, which is a continuation of Ser. No. 24,559, Mar. 1, 1993, abandoned.

[51] Int. Cl.⁶ .......................... A41D 19/00; B32B 25/16
[52] U.S. Cl. .......................... 428/519; 428/36.8; 2/161.7; 2/167; 2/168
[58] Field of Search .................. 428/36.8, 519; 427/2.3; 2/167, 161.7, 168; 525/299, 309

[56] References Cited

U.S. PATENT DOCUMENTS

| | | | |
|---|---|---|---|
| 3,360,599 | 12/1967 | Nyberg et al. | 264/216 |
| 4,070,713 | 1/1978 | Stockum | 2/168 |
| 4,143,109 | 3/1979 | Stockum | 264/112 |
| 4,853,978 | 8/1989 | Stockum | 2/167 |
| 4,855,169 | 8/1989 | McGlothlin | 428/35.2 |
| 5,112,900 | 5/1992 | Buddenhagen et al. | 524/484 |

*Primary Examiner*—Mark L. Warzel
*Attorney, Agent, or Firm*—Morgan & Finnegan, LLP

[57] ABSTRACT

The present invention provides improved powder-free gloves having improved cleanliness as well as desired ergonomics over current natural rubber latex gloves. By controlling the formulation used to construct the gloves, a wide range of physical performance, aging resistance, as well as high cleanliness can be achieved. To this end, the present invention provides a powder-free glove constructed from a sequential copolymer. In an embodiment, the sequential copolymer is chosen from the group consisting of: poly(styrene-b-isoprene-b-styrene); poly(styrene-b-butadiene-b-styrene); poly (styrene-b-ethylene butylene-b-styrene); poly(styrene-b-ethylene propylene-b-styrene); radial and teleblock copolymers of the type $(SI)_x$, $(SB)_x$, and the like; and graft copolymers.

6 Claims, 2 Drawing Sheets

SEQUENTIAL COPOLYMER BASED GLOVES

This application is a continuation of application Ser. No. 08/457,871, filed Jun. 1, 1995, now abandoned.

BACKGROUND OF THE INVENTION

The present invention relates to thermoplastic elastomer based powder-free gloves. More specifically, the present invention relates to gloves for use in clean rooms and for examination and surgical applications.

It is known to use rubber and plastic gloves in clean rooms. Clean rooms are used in a number of. industries including microelectronics, disc drives, semiconductors, aerospace, pharmaceuticals, medical devices, and biotechnology, to create controlled environments. Typically, natural rubber and polyvinyl chloride based gloves are used in these applications. However, these gloves have certain disadvantages.

Natural rubber based gloves contained surface as well as extractable contaminants. Due to these contaminants, it is difficult to meet the cleanliness levels required for many ultraclean environments. Likewise, polyvinyl chloride based gloves have certain disadvantages including the fact that the plasticizers typically used in polyvinyl chloride are detrimental in many clean room environments. In this regard, it should be noted that clean rooms are concerned with respect to many contaminants. Such contaminants include, ions, metals, nonvolatile residues, and other compounds.

A further disadvantage with many known thermoplastic gloves is that they are prepared by dipping a mold in a solution of the compound. See, for example, U.S. Pat. No. 3,933,723. The solution is prepared by dissolving the compound in a solvent, e.g., toluene. Such solvents create problems with respect to environmental issues.

Thermoplastic polyurethane clean room gloves have been explored. These gloves, however, are very expensive when compared to typical natural rubber clean room gloves. Still further, a disadvantage with these gloves is that they do not provide the latex-like characteristics that are desirable, especially ergonomics and fit. For example, due to the high modulus of many plastics and rubbers from which gloves are constructed, there is a high fatigue rate to the user. Still further, due to the nonelastic and high modulus characteristics of such gloves, the sizing of the gloves needs to be very precise. In this regard, it is necessary to have many different sizes, e.g., over eight, of gloves in order to accommodate the different individuals who may be working in the clean room.

There is therefore a need for an improved glove for use in a clean room environment.

SUMMARY OF THE INVENTION

The present invention provides improved clean room as well as powder-free examination and surgical gloves. The gloves provide improved cleanliness as well as desired ergonomics over current natural rubber latex gloves. In this regard, by controlling the formulation used to construct the gloves, a wide range of physical performance, aging resistance, as well as high cleanliness can be achieved.

To this end, the present invention provides a clean room powder-free glove constructed from a sequential copolymer.

In an embodiment, the sequential copolymer is chosen from the group consisting of: poly(styrene-b-isoprene-b-styrene); poly(styrene-b-butadiene-b-styrene); poly (styrene-b-ethylene butylene-b-styrene); poly(styrene-b-ethylene propylene-b-styrene); radial and teleblock copolymers of the type $(SI)_x$, $(SB)_x$, and the like (wherein S stands for styrene and B stands for butadiene); and graft copolymers.

In an embodiment, the graft copolymers are chosen from the group consisting of graft copolymers produced using polystyrene type macromers and graft copolymers produced using group transfer polymerizations.

In an embodiment, the glove is multilayer.

In an embodiment, the glove includes a middle layer of low styrene poly(styrene-b-isoprene-b-styrene) and inner/outer layers constructed from at least one material chosen from the group consisting of high styrene, i.e., the. styrene content of the block copolymer is greater than approximately 20%, poly(styrene-b-isoprene-b-styrene), poly (styrene-b-butadiene-b-styrene), poly(styrene-b-ethylene butylene-b-styrene), and poly(styrene-b-ethylene propylene-b-styrene). By selecting specific styrene contents, the resultant properties of the gloves can be varied.

The present invention also provides a method for making powder-free clean room gloves. To this end, the present invention provides a method comprising the steps of: providing a mold in the form of a glove; dipping the mold in an emulsion of a sequential copolymer; and allowing the emulsion to dry to the mold.

In an embodiment, the method includes the step of: dipping the mold in a release dip prior to dipping the mold in the emulsion.

In an embodiment, the method includes the step of dipping the mold in a release dip after dipping the mold in the emulsion and drying and rinsing the deposited film.

In an embodiment, the method includes the steps of using multiple dips of the mold into emulsions of sequential copolymers to create a multilayer structure. Preferably, each layer is dried prior to the application of the next layer.

In an embodiment, the method includes the step of using a surface chlorination process after the emulsion has dried.

Additionally, the present invention provides a method for creating powder-free clean room gloves comprising the step of using at least one sequential copolymer emulsion chosen to provide desired characteristics and properties to a resultant glove.

An advantage of the present invention is that it provides a clean room glove having improved cleanliness.

A further advantage of the present invention is that it provides a clean room glove that can provide a wide range of characteristics.

A still further advantage of the present invention is it provides a glove having ergonomics as good as or better than natural rubber latex gloves. This is especially true if low styrene SIS or acrylic based sequential copolymers are used.

Additionally, an advantage of the present invention is that it provides a glove that is powder-free.

Moreover, a further advantage of the present invention is that it provides a glove that can be manufactured without the use of a solvent.

Still further, an advantage of the present invention is that it provides a glove that is not unduly expensive as compared to standard natural rubber latex gloves.

Furthermore, an advantage of the present invention is that the copolymers used therein do not contain compounding ingredients, such as sulfur, zinc oxide, and accelerators, in the formulation. Accordingly, the gloves of the present invention do not require curing to achieve necessary strength characteristics.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
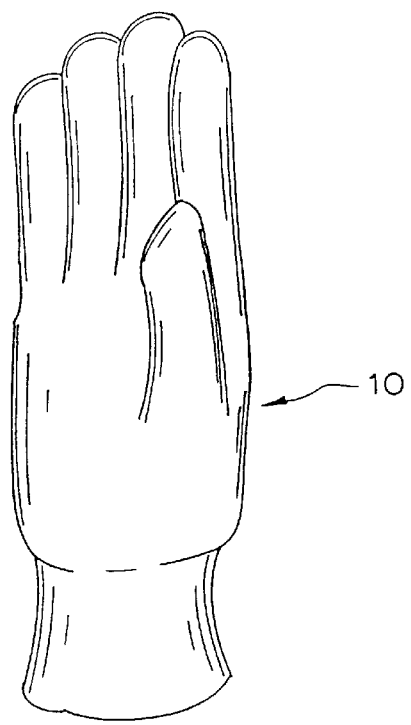
FIG. 1 illustrates a glove constructed pursuant to the present invention.

The present invention provides a glove that is powder-free. As used herein, "powder-free" means the glove has been manufactured to eliminate most, if not all, of the powder on the surface of the glove. The glove is constructed from a sequential copolymer. As used herein, "sequential copolymer" means a block copolymer or graft copolymer. This term, however, does not include thermoplastic polyurethane, which is typically referred to as a "segmented copolymer."

The sequential copolymers that are preferred, pursuant to the present invention, include block copolymer emulsions of the type poly(styrene-b-isoprene-b-styrene) (SIS), poly(styrene-b-butadiene-b-styrene) (SBS), poly(styrene-b-ethylene butylene-b-styrene) (SEBS), poly(styrene-b-ethylene propylene-b-styrene) (SEPS), radial or teleblock copolymers of the type $(SI)_X$, $(SB)_X$ and the like. By controlling the amount of polystyrene in the copolymer, the strength properties provided by the glove can be adjusted. Likewise, the coefficient of friction can be adjusted by adjusting the polystyrene content in the copolymer by applying various types of lubricous coatings. Various surface treatments - as discussed in an article by A. D. Roberts and C. A. Blackley, presented at the Rub. Div. Meeting, Las Vegas, May 29–Jun. 1, 1990 - can also be used if the sequential copolymer chosen is unsaturated to obtain a low friction donnable glove surface.

Additionally, graft copolymers produced using polystyrene type macromers can be used. Similarly, sequential block and graft copolymers produced by group transfer polymerizations can be used to create the gloves of the present invention.

One such sequential copolymer class includes the block and graft copolymers of styrene and isoprene, styrene and butadiene, styrene and ethylene butylene, styrene and ethylene propylene, and the like. Preparations of the block thermoplastic SIS and SBS type polymers are disclosed in U.S. Pat. No. 3,265,765, U.S. Patent No. 3,078,254, and U.S. Pat. No. 3,281,383, the disclosures of which are incorporated herein by reference. Preferably, these are used as an aqueous dispersion so that a current commercial manufacturing processes can be used. Such copolymers are available from Shell Chemical Company/Pierce and Steven (Varitech Division) under the tradename Prinlin and also from Dexco Polymers under the name Vector based emulsions (a triblock copolymer of styrene and isoprene).

Graft copolymers prepared from macromers based on styrene or alpha-methyl styrene can also be used. The preparations of several such copolymers are disclosed in U.S. Pat. No. 3,786,116, the disclosure of which is incorporated herein by reference. These macromers can be copolymerized with acrylic monomers to produce thermoplastic elastomers suitable for the above applications. The hydrophilic and solubility characteristics of the copolymer can be adjusted based on the copolymer composition.

Macromers prepared using group transfer polymerizations (GTP) can also be used. Procedures for preparing GTP based polymers are disclosed in U.S. Pat. No. 4,417,034, and U.S. Pat. No. 4,414,372, the disclosures of which are incorporated herein by reference.

The use of GTP "macromers" allows preparation of materials for the glove with high elongation at break, high strength, and very low modulus by engineering the molecular weight, and the level of hard segment in the sequential copolymer. Block copolymers based on group transfer polymerizations can also be used. Because the sequential polymers are in the form of an emulsion, many advantages are achieved with respect to the manufacturing process.

Figure 2:
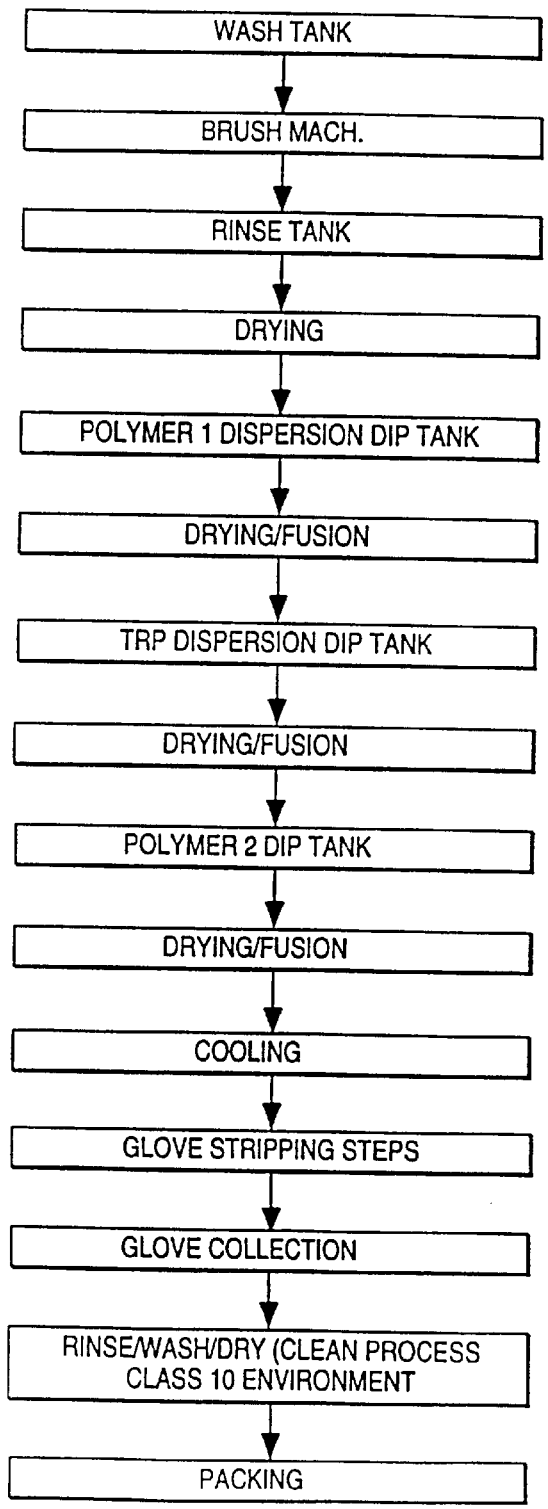
FIG. 2 illustrates in a flow chart an embodiment of a method for making the gloves of the present invention.

The glove 10, illustrated in FIG. 1, can be constructed pursuant to the present invention. FIG. 2 illustrates, as a flow chart, an embodiment of the process for making the glove 10. Of course, other methods can be used to make the gloves of the present invention. In this regard, certain of the steps set forth in the flow chart of FIG. 2 may not be necessary, e.g., wash/rinse cycle.

Figure 3:
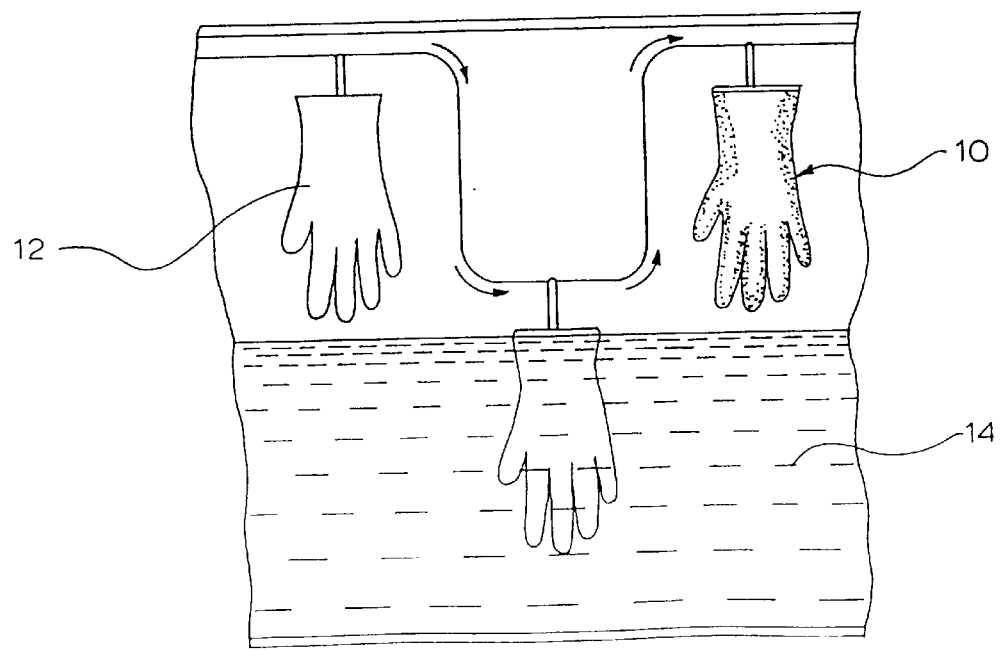
FIG. 3 illustrates, schematically, an embodiment of a portion of the method set forth in FIG. 2.

As illustrated in FIG. 3, a mold 12 is dipped in the sequential polymer 14 and the polymer is allowed to dry and fused to form the glove 10. Pursuant to the present invention, the sequential polymer is in the form of an emulsion. If desired, a release dip can be used prior to and after the emulsion dipping process. In this regard, the mold 12 can either be dipped in the release dip and then in the emulsion 14, or after the emulsion has dried, the mold is dipped into the release dip. The release dip will facilitate releasing the glove 10 from the mold 12 and prevent the gloves from sticking to each other during subsequent handling.

If desirable, for example, if SIS or SBS type polymers are used, one can use a surface chlorination process. After the glove is formed, the surface chlorination process can be used if the sequential copolymer selected has a rubbery sequence which is unsaturated as in SIS, SBS, $(SI)_X$, $(SB)_X$, etc. This makes an easily donnable glove and renders the outer surface contaminant-free.

If desired, multilayered gloves can be created. A multilayer structure allows one to provide a variety of properties to the gloves. To create a multilayer glove, multiple dips are made into the sequential copolymer emulsions of the present invention. For example, a glove can be constructed having a low styrene SIS middle layer and ultra thin layers of a high styrene SIS, SEBS, or SBS on the inner and outer layers. In an embodiment, the layers can be based on hydrophilic copolymers (hydrophilic acrylic and hydrophilic urethanes). When completely fused, this will create a structure that is contaminant-free and has a non-sticky surface without chlorination, or minimum levels of chlorination.

In order to improve aging characteristics of the film, one can use SEBS or SEPS copolymers for the outer layers. Other non-contaminant-free polymer compositions can also be used if desired.

In a further embodiment, a polystyrene macromer based sequential copolymer can be used. This provides a wider choice of stress strained properties and wider chemical resistance.

Additionally, acrylic polymers can be used as a component in the sequential structure. This will allow one to control the moisture barrier performance and improves user comfort.

In a further embodiment, macromers produced by group transfer polymerization are used. Such macromers can be based, for example, on polymethylmethacrylate. Such macromers can provide a wide range of monomers to produce the sequential copolymer. As illustrated above, it is possible to use a wide variety of combinations of different material of different layers to provide varying performance properties to the glove 10.

The resultant glove 10, illustrated in FIG. 1, provides many features and benefits that are desirable for clean rooms. For example, the glove 10 is contaminant-free (low extractable ions, particulates, and hydrocarbon contaminants). This is true in view of the fact that compounding additives typically used in natural rubber gloves are absent.

If desired, the powder-free gloves of the present invention can be created without a chlorination process. Additionally, since the gloves are thermoplastic, they are recyclable.

A further advantage of the present invention includes the -fact that the manufacturing process is simplified. This is due to the fact that compounding steps are not necessary.

A further advantage of the present invention is that it is protein-free. Likewise, the gloves of the present invention are hypo-allergenic.

Still further, the gloves of the present invention can provide better aging resistance. This is especially true if SEBS, SEPS, GTP, or acrylic polymers are used for the inner/outer layers.

Because one is able to provide improved tensile properties using sequential copolymers, thinner layers, can be created.

By way of example, and not limitation, examples of the present invention will now be given.

EXAMPLE NO. 1

Evaluation of Thermoplastic Elastomer Emulsions

The film forming characteristics of the SIS, SBS, and SEBS emulsions from Shell Chemical Company/Pierce and Stevens' (Varitech Division) were evaluated in a screening step to determine if the emulsions could provide acceptable films for making gloves or serve as compositions for coating on the existing natural rubber latex based gloves. The polymers evaluated include: Prinlin B 7248A (a Kraton FG 1901 emulsion), Prinlin B 7137X-1 (a Kraton D1107 emulsion), Prinlin B 7138A (a Kraton G 1657), Prinlin B 7138AD (a Kraton G 1657/FG1901 blend), Prinlin B 7216A (a Kraton D1101 emulsion) all available from Shell Chemical Company/Pierce & Stevens (Varitech Division).

The procedure used to create the film was as follows:
1. Preheat glass slides in an oven for 3–5 minutes.
2. The slide was dipped into the beaker containing the test sample and hung upside down with a clothespin; the drippings were caught into the same beaker.
3. The slide was dried with the filament of the sample in an oven: @ 250° F. (121° C.); @ 212° F. (100° C.); @ 122° F. (50° C.), for 20 minutes.
4. The slides were dipped into the beaker of sample, allowed to dry again in the oven. Dipping and drying was repeated four times.
5. The slides were then cooled and visually inspected with respect to the general appearance of the filament (clarity, presence of bubbles/particles and impurities). Filament was peeled off from the slide to further evaluate by checking the flexibility, strength, and the elasticity of the filament.

All of the emulsions formed continuous films.

EXAMPLE NO. 2

Evaluation of Emulsion

Prototype samples of gloves were made using starch dispersion and calcium carbonate dispersion as the release slurry and using Vector DPX emulsion containing an anti-web agent (1%) from Dexco Polymers. The emulsion is a styrene-isoprene-styrene block emulsion.

The procedure followed was as follows:
1. A ceramic glove mold/former was dipped into Emralon 312, a resin-bonded coating PTFE lubricant to prevent sticking and tearing of the thermoplastic elastomer during stripping. The mold was dried in an oven for 5–7 minutes. Temperature: 250° F.
2. Meanwhile, the emulsion was kept uniformly stirred. A 1% of Air Products Surfynol DF08 was added to markedly improve air release and reduce webbing.
3. Then, after drying the preheated and precoated glove mold was carefully and slowly dipped into the stirred emulsion.
4. The mold was emerged from the emulsion slowly and an orchestrated waving motion to distribute the emulsion evenly across the back of the mold was performed to ensure a thin filament coating.
5. The film was then dried at 100° C. for 15 minutes.
6. The glove was cooled (and mold/former) to near ambient before attempting to strip it off.

Results and Observations:

SIS film had the same characteristics as the natural rubber.

Good Tactile feel. General Appearance: Translucent, white to very stretchy.

| Finger Thickness: | 0.11 mm |
|---|---|
| Palm Thickness: | 0.07 mm |
| Cuff Thickness: | 0.08 mm |
| Tensile Strength: | 2400 psi |
| Elongation: | 1260% |

Evaluation with:
1. SIS and 80% Prinlin B7137X-1 (Kraton D1107)
   Clear to slightly hazy.
   It is a fairly good film.
   Very strong.
   Presence of white particles.
2. SIS and 80% Prinlin B7248A (Kraton FG1901)
   Hazy film.
   Not sticky at all.
   Fairly good, strong film.
3. SIS and 80% Prinlin B7138A (Kraton G1657)
   Clear to very slightly hazy film.
   Presence of tiny white particles.
   Fairly good and strong film.
4. SIS and 80% Prinlin B7138AD (Kraton G1657/FG1901)
   Hazy film.
   Not sticky.
   Good adhesion. Fairly good and strong film.
5. SIS and 80% Prinlin B7216A (Kraton D1101)
   Slightly hazy to clear film.
   Not sticky.
   Fairly good and strong film.

After drying and fusing, the samples produced good elastomeric gloves which could be further processed to clean room gloves by chlorination. The release slurry could be replaced by using a polymeric non-stick coating for the inside and outside layers of the glove.

EXAMPLE NO. 3

To produce a block copolymer glove based on SIS, SBS, etc. by using multidip procedure. A multidip product was provided which included a high styrene content containing SIS or SBS polymer as the first thin layer dip, followed by drying and then a thick (approximately 7 mils) second layer of low styrene SIS followed by drying and then another dip of the high styrene SIS or SBS, as the third dip, which layer was thin. The outer high styrene layers provides the nonstick coating, so that the chlorination step can be eliminated for making powder-free gloves. A high styrene SIS or SBS was more compatible with the mid-low styrene SIS or SBS. Hence, after fusing the layers, the layers will not separate. This can be used for making powder-free clean room gloves.

EXAMPLE NO. 4

A glazed ceramic former was heated to 70° C. and dipped in 30% treated corn starch slurry (Keoflo 886 from National Starch and Chemical Corp.) to obtain a uniform distribution of corn starch on the former. After drying the coating, it was dipped into an SIS emulsion DPX-525 (Dexco Polymers). The solid content of this emulsion is 55 (wt. %). The mold was withdrawn and drained and rotated to distribute the coating uniformly around the mold surface. The sample was then dried and film fused at 115° C. for 20 minutes. The sample was then cooled to near 40° C. and a bead is rolled. The sample was then dipped into the corn starch slurry for ease of removal of the glove from the mold. The sample was removed from the mold and chlorinated using about 1,000 ppm of chlorine in water in a Chlorinator.

The chlorinated glove was powder-free and easily donnable. For surgical application, the samples could be radiation sterilized.

Samples were also produced by double dipping in the SIS emulsion, drying the first layer of SIS prior to application of the 2nd layer. This produced thicker gloves with less pinholes.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A powder-free and protein-free multiple layered glove comprising an inner layer, an outer layer and a middle layer between the inner and outer layers wherein the inner and outer layers are each constructed from at least one sequential copolymer selected from the group consisting of: high styrene poly(styrene-b-isoprene-b-styrene), poly(styrene-b-butadiene-b-styrene), poly(styrene-b-ethylene butylene-b-styrene) and poly(styrene-b-ethylene-propylene-b-styrene) and the middle layer is constructed from poly(styrene-b-isoprene-b-styrene) wherein the styrene content of the high styrene sequential copolymers is greater than approximately 20wt. %.

2. The multiple-layered powder-free and protein-free glove of claim 1, wherein the middle layer is constructed from poly(styrene-b-isoprene-b-styrene) wherein the styrene content of the poly(styrene-b-isoprene-b-styrene) is about 14% to about 20 wt. %.

3. The multiple-layered powder-free and protein-free glove of claim 1, wherein the middle layer is constructed from poly(styrene-b-isoprene-b-styrene) wherein the styrene content of the poly(styrene-b-isoprene-b-styrene) is about 14 wt. % to about 15 wt. %.

4. The multiple-layered powder-free and protein-free glove of claim 1, wherein the inner and outer layer are not made from the same sequential copolymer.

5. The multiple-layered powder-free and protein-free glove of claim 2, wherein the inner and outer layer are not made from the same sequential copolymer.

6. The multiple-layered powder-free and protein-free glove of claim 3, wherein the inner and outer layer are not made from the same sequential copolymer.

* * * * *

UNITED STATES PATENT AND TRADEMARK OFFICE
CERTIFICATE OF CORRECTION

PATENT NO. : 5,851,683

DATED : December 22, 1998

INVENTOR(S) : Plamthottam, et al.

It is certified that error appears in the above-identified patent and that said Letters Patent is hereby corrected as shown below:

Column 1, delete line 4 and 5, and substitute therefore with --This application is a continuation of Serial No. 08/457,871, filed on June 1, 1995, now abandoned, which is a division of Serial No. 08/370,212, filed on January 6, 1995, now abandoned, which is a continuation of Serial No. 08/024,559, filed March 1, 1993, now abandoned.--

Signed and Sealed this

Twenty-third Day of February, 1999

Attest:

Q. TODD DICKINSON

*Attesting Officer*  *Acting Commissioner of Patents and Trademarks*